United States Patent
Anderson et al.

(10) Patent No.: US 6,393,273 B1
(45) Date of Patent: May 21, 2002

(54) METHOD OF AND SYSTEM FOR DETERMINING ARQ CAPABILITY OF A BASE STATION

(75) Inventors: Keith William Anderson, Durham; Scott Gordon Hicks, Apex, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/103,128

(22) Filed: Jun. 23, 1998

(51) Int. Cl.[7] .................................................. H04Q 7/22
(52) U.S. Cl. ........................ 455/414; 455/517; 370/346
(58) Field of Search ................................ 370/346, 329, 370/352; 455/517, 67.1, 67.4, 67.7, 69, 68, 432, 435, 414

(56) References Cited

U.S. PATENT DOCUMENTS

| | | | | |
|---|---|---|---|---|
| 5,577,046 A | * | 11/1996 | Diachina et al. | 370/252 |
| 5,633,874 A | * | 5/1997 | Diachina et al. | 370/329 |
| 5,694,391 A | * | 12/1997 | Diachina et al. | 370/346 |
| 5,701,298 A | * | 12/1997 | Diachina et al. | 370/346 |
| 6,006,091 A | * | 12/1999 | Lupien | 455/414 |
| 6,069,886 A | * | 5/2000 | Ayerst et al. | 370/336 |
| 6,157,835 A | * | 12/2000 | Findkli et al. | 455/436 |

FOREIGN PATENT DOCUMENTS

| | | |
|---|---|---|
| WO | 9107038 | 5/1991 |
| WO | WO 98/26625 | 6/1998 |
| WO | 9826625 | 6/1998 |

OTHER PUBLICATIONS

Interim Standard 136.1–A, pp. 307–331; 332–7; 332–15 to 332–41.

Interim Standard 136.2 Rev. A (Oct. 1996), pp. 179–187; 190–193; 215–216; 218–219; 235–255; 270–272; 355.

* cited by examiner

*Primary Examiner*—Edward F. Urban
(74) *Attorney, Agent, or Firm*—Myers Bigel Sibley & Sajovec

(57) ABSTRACT

A digital radio communication system has a mobile station and a base station, the mobile station transmitting messages to the base station in a series of frames. Each frame has a header with a frame number and an optional polling indicator. A method of determining whether the base station is capable of receiving a message in automatic retransmission request (ARQ) format is provided. The method includes the step of transmitting from the mobile station to the base station a single frame in ARQ format with a polling indicator set such that the base station is prompted to send a status frame in ARQ format if the base station is capable of receiving messages in ARQ format. The method also has the step of determining if a status frame in ARQ format is sent from the base station to the mobile station in response to the single frame. A mobile station operating according to the method of the present invention is also provided.

21 Claims, 4 Drawing Sheets

METHOD OF AND SYSTEM FOR DETERMINING ARQ CAPABILITY OF A BASE STATION

FIELD OF THE INVENTION

The present invention is directed to a method of and a system for determining if a base station is capable of receiving messages in automatic retransmission request (ARQ) format.

BACKGROUND OF THE INVENTION

With reference to FIG. 1, it is known in the art to have a mobile station 20 in radio communication with a base station 22, which is connected to and in communication with a public switched telephone network 24. Radio communication between the mobile station 20 and the base station 22 is represented by a double-headed arrow 26.

In particular, the mobile station 20 and the base station 22 communicate on various radio frequencies, also referred to in the art as channels. The channels are usually classified as being either traffic channels or control channels. The traffic channels are used to bear information during the conversation state of a call. The control channels are used for the exchange of information between the mobile station 20 and the base station 22 relating, for example, to call setup (i.e. initiating a communications session between the mobile station 20 and the base station 22 on a traffic channel).

To send a voice or data message from the mobile station 20 to the base station 22, the mobile station 20 first sends a traffic channel (origination) request message on a control channel to the base station 22 to request access to one of the traffic channels associated therewith. In response, the base station 22 sends a traffic channel assignment message to the mobile station 20 on a control channel containing a designation of the traffic channel which is allocated to the mobile station 20. (These steps are referred to as "launching" the communication). The mobile station 20 then uses the allocated traffic channel to transmit a voice or data message from the mobile station 20 to the base station 22.

It is also known in the art that there are two general types of radio communication systems, analog and digital, with control and traffic channels on an analog system being referred to as analog control and traffic channels, and with control and traffic channels on a digital system being referred to as digital control and traffic channels. The two types of systems differ in that a message on the traffic channel of a digital system is digitized, i.e. the message is divided up into small segments which are then transmitted and reassembled upon receipt to form the message.

For example, if the traffic channel is a digital traffic channel, then a message to be communicated between the mobile station 20 and the base station 22 is divided into a number of segments, referred to as frames. At the present time, the individual frames are transmitted one at a time in one of a plurality of time slots into which the traffic channel is divided in the time domain. Typically, a digital traffic channel is presently divided into three time slots.

When the base station 22 receives a message on a digital traffic channel, the base station 22 will initially wait to assemble all of the frames received from the mobile station 20, and then attempt to reconstruct the message. If one or more of the frames are lost in transmission between the mobile station 20 and the base station 22, however, the base station 22 will be unable to reconstruct the message, and the message is lost. The frames may be lost, for example, because of electromagnetic noise on the traffic channel, noise being practically impossible to absolutely filter out of all radio communications.

It is therefore known in the art to format the message to be transmitted on a digital traffic channel in what is known as automatic retransmission request (ARQ) format. In ARQ format, each of the frames of the message is given a frame number. As a consequence, the base station 22 can determine whether all of the frames of the message have been received from the mobile station 20. If one or more frames of the message are missing, i.e. have not been received by the base station 22, the base station 22 can send an ARQ status frame to the mobile station 20 asking for retransmission of those specific frames which were not received by the base station 22. In this fashion, the loss of one or more frames in the transmission of a message from the mobile station 20 to the base station 22 does not result in the loss of the entire message.

Unfortunately, not all base stations are equipped to receive messages from a mobile station in ARQ format. Consequently, it is necessary for a mobile station, such as the mobile station 20, to determine whether the base station, for example the base station 22, is ARQ capable.

It is therefore known in the art for a mobile station, such as the mobile station 20, to prepare a capability update request which is transmitted to the base station 22. The base station 22 then responds with a capability update response, from which the mobile station 20 can determine the ARQ capability of the base station 22.

This prior art method is explained in greater detail with reference to FIGS. 1 and 2. A mobile station 20 used in the prior art method described above may have an antenna 28, a transmitter/receiver 30, a microprocessor 32, a memory 34, an input/output assembly 36, and a bus 38. The bus 38 can be used to transfer information between the transmitter/receiver 30, the microprocessor 32, the memory 34, and the input/output assembly 36. In addition, the base station 22 has an antenna 39 which is used to receive messages from the mobile station 20.

As is shown in FIG. 2, upon receiving a message at a block 40, a program operating in the microprocessor 32 formats a capability update request at a block 42. The program controls the microprocessor 32 to transmit the capability update request via the transmitter/receiver 30 and the antenna 28 to the base station 22 at a block 44.

The mobile station 20 then waits for a capability update response to be sent from the base station 22 to the mobile station 20 at a block 46. Once the capability update response has been received by the mobile station 20, the program controls the microprocessor 32 to read the response and to determine therefrom whether the base station 22 is ARQ capable at a block 48.

If the base station 22 is ARQ capable, then the program controls the microprocessor 32 to format the message received at the block 40 in ARQ format at a block 50. The program then controls the microprocessor 32 to control the transmitter/receiver 30 to send the message formatted in ARQ to the base station 22 at a block 52. The program ends at a block 54.

If the microprocessor 32 determines at the block 48 that the base station 22 is not ARQ capable, then at block 56 the program controls the microprocessor 32 to format the message received at the block 40 in non-ARQ format. The microprocessor 32 then controls the transmitter/receiver 30 at a block 58 to transmit the message in non-ARQ format to the base station 22. The program then ends at the block 54.

One disadvantage of the prior art method is the time required for the mobile station 20 to format the capability update request and for the base station 22 to format the capability update response. The preparation of the request and the response can cause a delay in communication between the mobile station 20 and the base station 22 which is typically viewed by users of mobile stations 20 as undesirable.

Another disadvantage of the prior art method is that while the request typically takes only a single frame, the response usually requires two frames. As a consequence, the process of determining the ARQ capability of a base station requires three links, one uplink and two downlinks. The additional downlink required adds time to the overall method.

Alternatively, provided the communication between the mobile station 20 and the base station 22 is launched using a digital control channel, the mobile station 20 may be able to determine the ARQ capability of a base station 22 by continuously determining the protocol version that is being transmitted on the digital traffic channel used to communicate with the base station 22. From the protocol version information, and from information from the digital control channel on which the message was originally launched from the mobile station 20, it is possible for the mobile station 20 to infer whether the base station 22 which it is presently in communication with supports ARQ messages.

This method breaks down if the mobile station originally launched communication on an analog control channel, or if the mobile station 20 is handed off to an analog traffic channel at any point during the transmission. Under such circumstances, it may be nearly impossible for the mobile station 20 to determine the ARQ capability of the base station 22 based on the protocol version transmitted with a digital traffic channel.

A further alternative is to transmit all messages from the mobile station 20 in non-ARQ format if the mobile station 20 is ever handed off to an analog traffic channel, or if the transmission is initiated from an analog control channel. Such a method has the obvious disadvantage that it does not take advantage of the ARQ format in those base stations 22 which support ARQ formatted messages.

SUMMARY OF THE INVENTION

According to an aspect of the present invention, a digital radio communication system has a mobile station and a base station, the mobile station transmitting messages to the base station in a series of frames. Each frame has a header with a frame number and an optional polling indicator. A method of determining whether the base station is capable of receiving a message in automatic retransmission request (ARQ) format is provided. The method includes the step of transmitting from the mobile station to the base station a single frame in ARQ format with a polling indicator set such that the base station is prompted to send a status frame in ARQ format if the base station is capable of receiving messages in ARQ format. The method also has the step of determining if a status frame in ARQ format is sent from the base station to the mobile station in response to the single frame.

The method may also have the step of providing a message to be transmitted from the mobile station to the base station. Additionally, the method may have the step of formatting the message to be transmitted from the mobile station to the base station as at least one message frame in ARQ format, the one message frame corresponding to the single frame.

In a preferred embodiment, the step of determining if a status frame in ARQ format is sent may include the step of determining if a status frame in ARQ format is sent from the base station to the mobile station within a predetermined period of time from when the single frame was transmitted from the mobile station to the base station. The predetermined period of time may be three seconds.

According to another aspect of the invention, a digital radio communication system has a mobile station and a base station, the mobile station transmitting messages to the base station in a series of frames. Each frame has a header with a frame number and an optional polling indicator. A method of managing communication between the mobile station and the base station is provided. The method includes the step of formatting a message to be communicated from the mobile station to the base station as at least one message frame in automatic retransmission request (ARQ) format. The method also has the step of transmitting from the mobile station to the base station the one message frame in ARQ format with a polling indicator set such that the base station is prompted to send a status frame in ARQ format if the base station is capable of receiving messages in ARQ format. Additionally, the method has the step of transmitting any frames of the formatted message other than the one message frame in ARQ format only if the status frame in ARQ format is received from the base station by the mobile station.

In a preferred embodiment, the step of transmitting any frames of the formatted message other than the one message frame may include the step of transmitting any frames of the formatted message other than the one message frame in ARQ format only if the status frame in ARQ format is received from the base station by the mobile station within a predetermined time from when the one message frame was transmitted from the mobile station to the base station. The predetermined period of time may be three seconds.

The method may include the step of transmitting the message in a format other than the ARQ format if the status frame in ARQ format is not received from the base station. Moreover, the step of transmitting the message in a format other than ARQ format may include the step of transmitting the message in a format other than ARQ format if a status frame in ARQ format is not received from the base station within a predetermined period of time from when the one message frame was transmitted from the mobile station to the base station. Preferably, the predetermined period of time is three seconds.

According to a further aspect of the present invention, a mobile station capable of communicating with a base station is provided. The mobile station has a transmitter/receiver and a microprocessor coupled to the transmitter/receiver. A program operates in the microprocessor to transmit from the mobile station to a base station via the transmitter/receiver a single frame in automatic retransmission request (ARQ) format with a polling indicator set such that the base station is prompted to send a status frame in ARQ format if the base station is capable of receiving messages in ARQ format. The program also operates in the microprocessor to operate the microprocessor to determine if a status frame in ARQ format has been received by the transmitter/receiver from a base station in response to the single frame.

Moreover, the program may operate in the microprocessor to operate the microprocessor, in response to receipt of a message to be transmitted from the mobile station to the base station, to format the messages at least one message frame in ARQ format, the one message frame corresponding to the single frame.

In a preferred embodiment, the program may operate in the microprocessor to operate the microprocessor to determine if a status frame in ARQ format is sent from a base station to the mobile station within a predetermined period of time from when the single frame was transmitted from the mobile station to the base station. The predetermined period of time may be three seconds.

DETAILED DESCRIPTION OF THE PREFERRED EMBODIMENT

Figure 1:
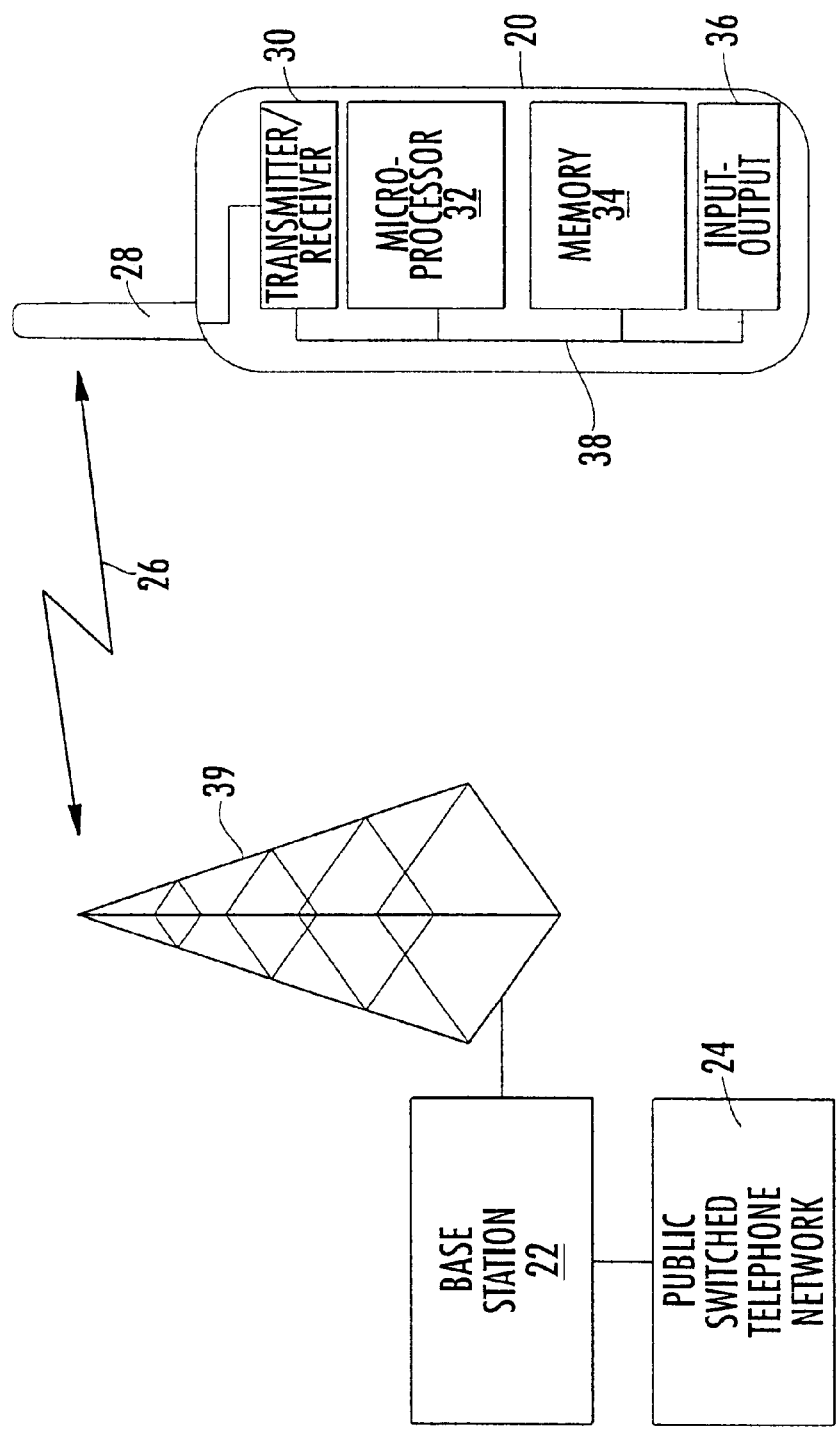
FIG. 1 is a schematic representation of a mobile station in radio communication with a base station according to the prior art.

A method of and a system for determining the ARQ capability of a base station which can be used with the prior art devices of FIG. 1 is now described with reference to FIGS. 1, 3 and 4. As was mentioned above, FIG. 1 shows the mobile station 20 in radio communication with the base station 22, which is connected to and in communication with the public switched telephone network 24. Communication between the mobile station 20 and the base station 22 is shown by the arrow 26.

As further described above, the mobile station 20 includes the antenna 28, the transmitter/receiver 30, the microprocessor 32, the memory 34, and the input/output assembly 36. The transmitter/receiver 30, the microprocessor 32, the memory 34, and the input/output assembly 36 are connected by the bus 38 such that information can be transferred between these four elements of the mobile station 20. The base station 22 has the antenna 39 for communicating with the mobile station 20.

Figure 3:
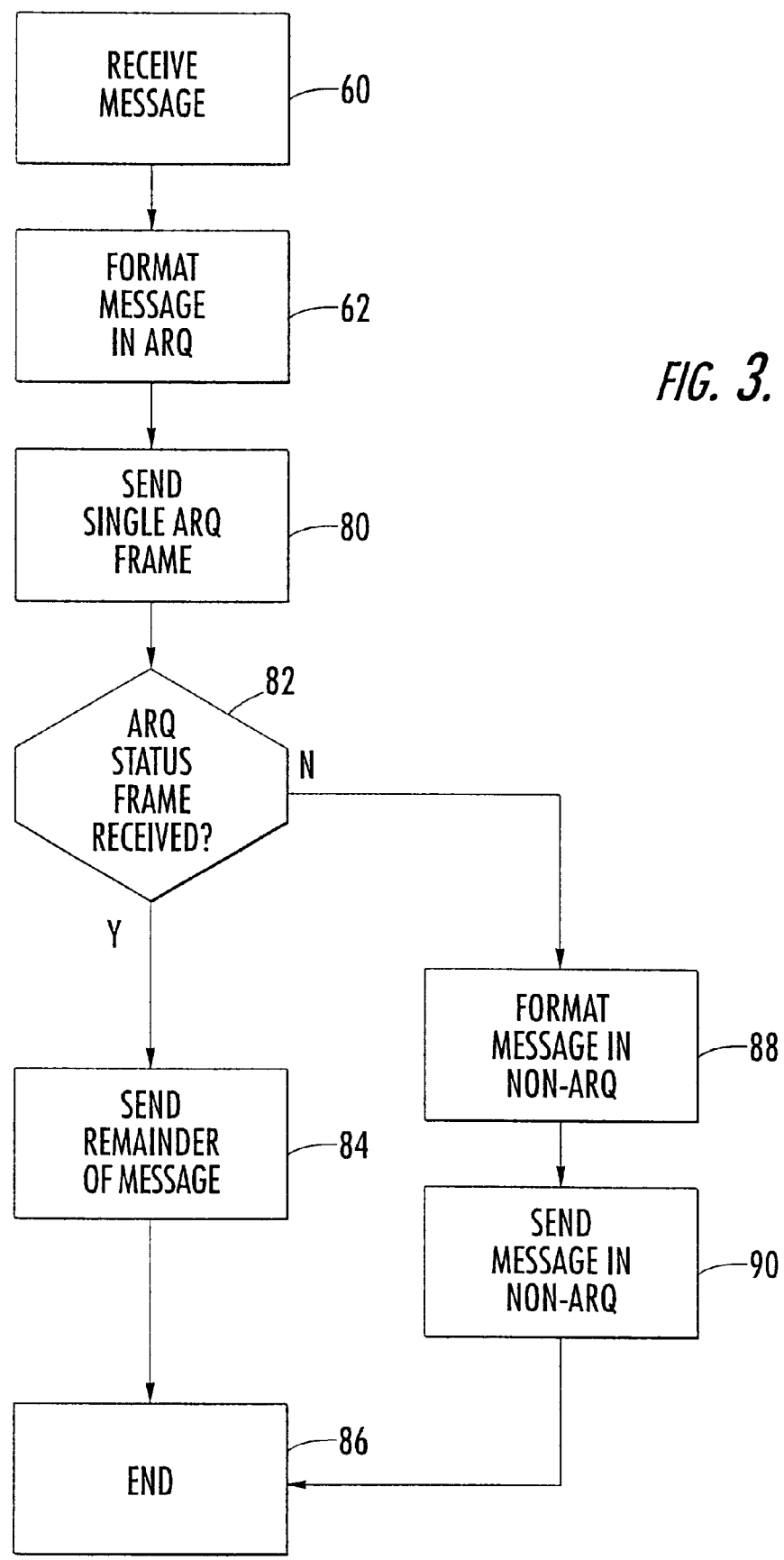
FIG. 3 is a flow chart showing the method of determining the ARQ capability of a base station according to the present invention.

Turning now to FIG. 3, the method begins when the microprocessor 32 receives a message from the input/output assembly 36 at a block 60. A program operating in the microprocessor 32 then formats the message in ARQ format at a block 62.

Figure 4:
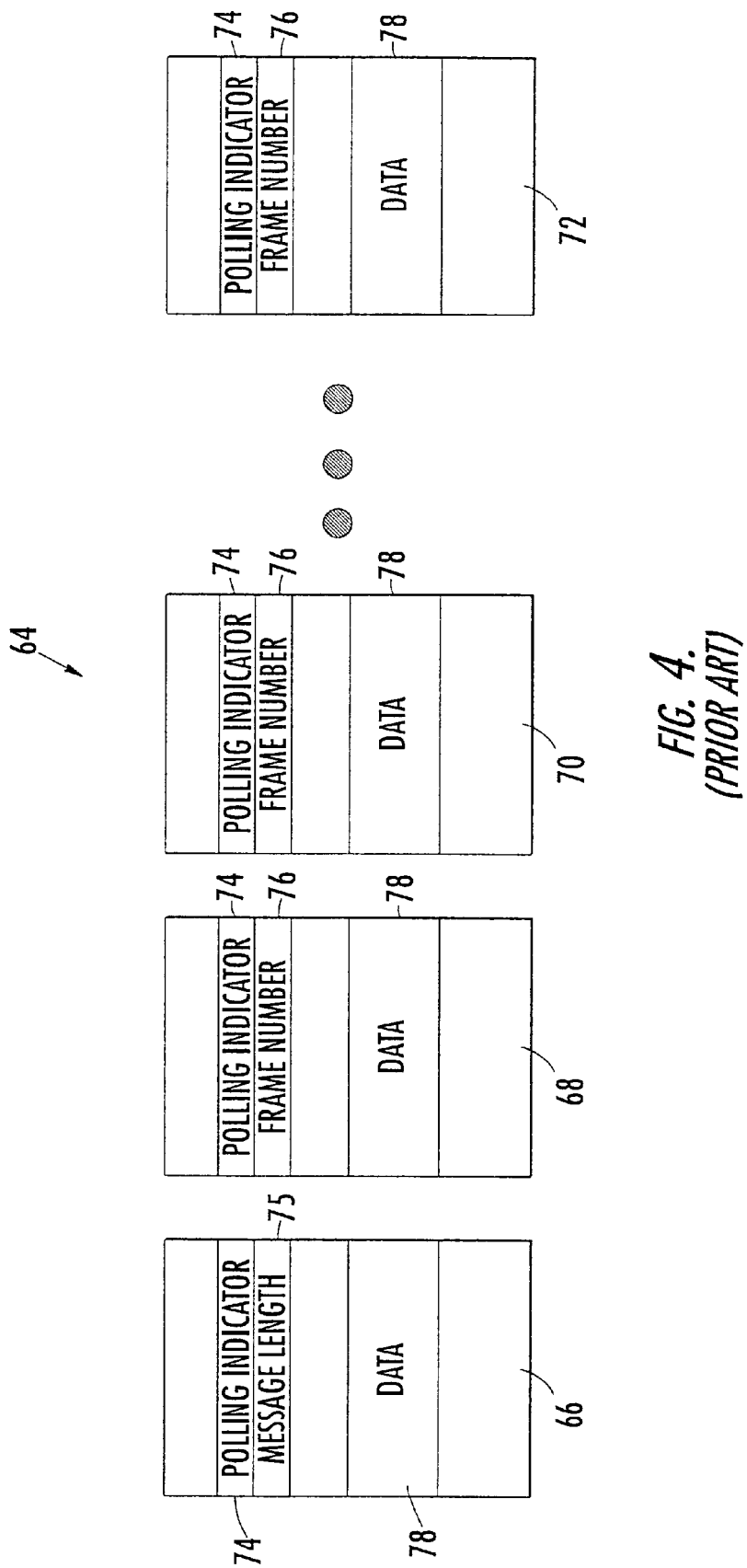
FIG. 4 is a schematic representation of a message formatted in ARQ format to be transmitted on a digital traffic channel according to the prior art.

FIG. 4 shows a message 64 which has been formatted in ARQ format into a plurality of frames, for example, frames 66, 68, 70 and 72. Each of the frames 66, 68, 70, 72 has a polling indicator 74, a length indicator 75 or a frame number 76, and data 78. As is known in the art, each of the frames 66, 68, 70, 72 in ARQ format may have additional fields for the transmission of information between the mobile station 20 and the base station 22. However, only the polling indicator 74, the length indicator 75, the frame number 76, and the data 78 are necessary to explain the method.

Preferably, the program operating in the microprocessor 32 controls the microprocessor 32 to format one frame of the message 64, such as the first frame 66, such that the polling indicator 74 is set to prompt the base station 22, if the base station 22 is ARQ capable, to send an ARQ status frame in response to receipt of the frame 66. The other frames 68, 70, 72 may also have their polling indicators 74 set to prompt the base station 22 to send a status frame. However, the method only requires that one of the frames, in this case the frame 66, have its polling indicator 74 set to prompt the base station 22 to send a status frame.

At block 80, the program controls the microprocessor 32 to control the transmitter/receiver 30 to send the first frame 66 of the message 64 to the base station 22. According to the method, the frame which has had the polling indicator set to prompt the base station 22 to send a status frame in response (i.e. frame 66) is sent from the mobile station 20 to the base station 22.

The mobile station 20 then waits a predetermined period of time, preferably no more than three seconds, for an ARQ status frame to be sent from the base station 22 to the mobile station 20. At the block 82, the program controls the microprocessor 32 to determine whether an ARQ status frame has been received from the base station 22 within the predetermined period of time. The microprocessor 32 may make the determination that an ARQ status frame has been received from the base station 22 before the predetermined period elapses. However, the microprocessor 32 will make the determination at the block 82 that no status frame has been received if such status frame has not been received within the predetermined period of time.

If the microprocessor 32 determines at the block 82 that an ARQ status frame has been received from the base station 22 in response to the ARQ frame 66, then the program controls the microprocessor 32 at a block 84 to send the remainder of the message to the base station 22. The program then ends at a block 86.

If the microprocessor 32 determines that an ARQ status frame was not received from the base station 22 within the predetermined period of time at the block 82, then the program controls the microprocessor 32 to format the message in non-ARQ format at a block 88, and to send the message in non-ARQ format to the base station 22 at a block 90. The program then ends at block 86.

The operation of the system is now discussed, assuming that the base station 22 is ARQ capable and with the mobile station 20 using a program as illustrated in FIG. 3 to operate the microprocessor 32. When the user provides a message via the input/output assembly 36 to the microprocessor 32, the program controls the microprocessor 32 to format the message 64 in ARQ format at the block 62. A single frame of the message 64, preferably the first frame 66, is transmitted from the mobile station 20 to the base station 22 at the block 80.

At the block 82, the microprocessor 32 determines that the base station 22 has sent the status frame, and is therefore ARQ capable.

Consequently, the program controls the microprocessor 32 to control the transmitter/receiver 30 to transmit the remainder of the message formatted in ARQ format to the base station 22 at the block 84. Once the remainder of the message has been transmitted, the program ends at the block 86.

However, if the base station 22 is not ARQ capable, then at the block 82, the microprocessor 32 would have determined that the base station 22 did not send a status frame in the predetermined period of time, and the base station 22 is therefore not ARQ capable. Consequently, the program controls the microprocessor 32 to format the message in non-ARQ format at the block 88, and to send the message in non-ARQ format to the base station 22 at the block 90. The program would then end at the block 86.

Figure 2:
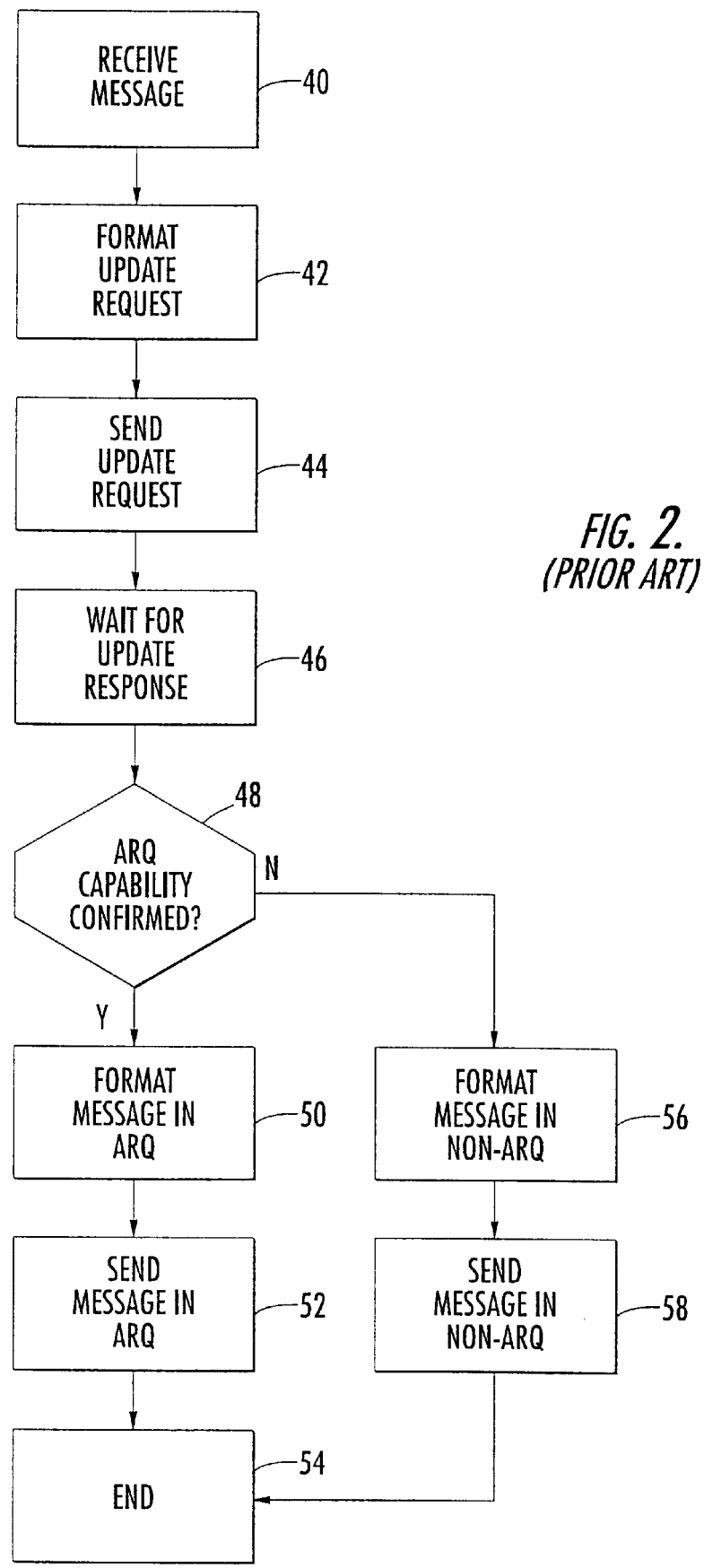
FIG. 2 is a flow chart showing a method for determining the ARQ capability of a base station according to the prior art.

By operating the mobile station 20 in accordance with the method of FIG. 3, some of the significant sources of delay of the prior art method as illustrated in FIG. 2 may be eliminated. For example, in the prior art method described above in FIG. 2, it is necessary to format two separate messages whether the base station 22 is ARQ capable or not. By employing the method of FIG. 3, if the base station 22 is ARQ capable, then only the data or voice message need be formatted, the first frame of that message being used to determine the ARQ capability of the base station 22.

Moreover, the time required for the mobile station to format the message in ARQ format and for the base station to format a response in an ARQ status frame is considerably less than the amount of time necessary for the mobile station to prepare the capability update request and for the base station to prepare the appropriate capability update response. The reduction in formatting time translates into overall time savings when using the method of FIG. 3.

Additionally, as the mobile station 20 sends a single frame, and the base station 22 responds with a single status frame, only one downlink and one uplink are required. This is contrasted with the prior art method which required one uplink and two downlinks.

Still other aspects, objects, and advantages of the present invention can be obtained from a study of the specification, the drawings, and the appended claims.

We claim:

1. In a digital radio communication system having a mobile station and a base station, the mobile station transmitting messages to the base station in a series of frames, each frame having a header with a frame number and an optional polling indicator, a method of determining whether the base station is capable of receiving a message in automatic retransmission request (ARQ) format comprising the steps of:

transmitting from the mobile station to the base station a single frame in ARQ format with a polling indicator set such that the base station is prompted to send a status frame in ARQ format if the base station is capable of receiving messages in ARQ format; and determining if a status frame in ARQ format is sent from the base station to the mobile station in response to the single frame.

2. The method according to claim 1, further comprising the steps of:

providing a message to be transmitted from the mobile station to the base station; and formatting the message to be transmitted from the mobile station to the base station as at least one message frame in ARQ format, the one message frame corresponding to the single frame.

3. The method according to claim 1, wherein the step of determining if a status frame in ARQ format is sent comprises the step of determining if a status frame in ARQ format is sent from the base station to the mobile station within a predetermined period of time from when the single frame was transmitted from the mobile station to the base station.

4. The method according to claim 3, wherein the predetermined period of time is three seconds.

5. In a digital radio communication system having a mobile station and a base station, the mobile station transmitting messages to the base station in a series of frames, each frame having a header with a frame number and an optional polling indicator, a method of managing communication from the mobile station to the base station comprising the steps of:

formatting a message to be communicated from the mobile station to the base station as at least one message frame in automatic retransmission request (ARQ) format;

transmitting from the mobile station to the base station the one message frame in ARQ format with a polling indicator set such that the base station is prompted to send a status frame in ARQ format if the base station is capable of receiving messages in ARQ format;

transmitting any frames of the formatted message other than the one message frame in ARQ format only if a status frame in ARQ format is received from the base station by the mobile station.

6. The method according to claim 5, wherein the step of transmitting any frames of the formatted message other than the one message frame comprises the step of transmitting any frames of the formatted message other than the one message frame in ARQ format only if a status frame in ARQ format is received from the base station by the mobile station within a predetermined period of time from when the one message frame was transmitted from the mobile station to the base station.

7. The method according to claim 6, wherein the predetermined period of time is three seconds.

8. The method according to claim 5, further comprising the step of transmitting the message in a format other than ARQ format if a status frame in ARQ format is not received from the base station.

9. The method according to claim 8, wherein the step of transmitting the message in a format other than ARQ format comprises the step of transmitting the message in a format other than ARQ format if a status frame in ARQ format is not received from the base station within a predetermined period of time from when the one message frame was transmitted from the mobile station to the base station.

10. The method according to claim 9, wherein the predetermined period of time is three seconds.

11. A mobile station capable of communicating with a base station, the mobile station having:

a transmitter/receiver;

a microprocessor coupled to the base station transmitter/receiver; and a program operating in the microprocessor to operate the microprocessor to transmit from the mobile station to a base station via the transmitter/receiver a single frame in automatic retransmission request (ARQ) format with a polling indicator set such that the base station is prompted to send a status frame in ARQ format if the base station is capable of receiving messages in ARQ format, and to determine if a status frame in ARQ format has been received by the transmitter/receiver from a base station in response to the single frame.

12. The mobile station according to claim 11, wherein the program operates in the microprocessor to operate the microprocessor, in response to receipt of a message to be transmitted from the mobile station to a base station, to format the message to as at least one message frame in ARQ format, the one message frame corresponding to the single frame.

13. The mobile station according to claim 11, wherein the program operates in the microprocessor to operate the microprocessor to determine if a status frame in ARQ format has been received by the transmitter/receiver from the base station within a predetermined period of time from when the single frame was transmitted from the mobile station to the base station.

14. The mobile system according to claim 13, wherein the predetermined period of time is three seconds.

15. A method of determining a capability of a base station to receives message frames transmitted by a mobile station in an automatic retransmission request (ARQ) format, the method comprising:

transmitting a frame of a message in an ARQ format from a mobile station to a base station prior to determining at the mobile station whether the base station is capable of receiving frames of messages in the ARQ format wherein the frame of the message comprises a first frame of the message;

determining whether a response to the frame of the message is received at the mobile station; and re-transmitting the first frame of the message in a non-ARQ format upon determining that the response to the first frame of the message was not received at the mobile station.

16. A method of determining a capability of a base station to receives message frames transmitted by a mobile station in an automatic retransmission request (ARQ) format, the method comprising:

transmitting a frame of a message in an ARQ format from a mobile station to a base station prior to determining at the mobile station whether the base station is capable of receiving frames of messages in the ARQ format; and determining whether a response to the frame of the message is received at the mobile station;

wherein the transmitting a frame of a message in an ARQ format from a mobile station to a base station prior to determining at the mobile station whether the base station is capable of receiving frames of messages in the ARQ format comprises transmitting the frame including a polling indicator from the mobile station to the base station prior to determining at the mobile station whether the base station is capable of receiving frames of messages in the ARQ format.

17. The method of claim 16 wherein the frame of the message comprises a first frame of the message, the method further comprising:

transmitting a second frame of the message in the ARQ format upon determining that the response to the first frame of the message frame was received at the mobile station.

18. The method of claim 16 wherein the frame of the message comprises one of a plurality of frames of the message that carry information from the mobile station to the base station.

19. The method of claim 16 wherein the response comprises a single frame of a message received at the mobile station.

20. A mobile station that communicates with a base station, the mobile station comprising:

a transmitter/receiver circuit configured to transmit messages to a base station and configured to receive messages from the base station; and a circuit, electrically coupled to the transmitter/receiver circuit, wherein the circuit is configured to transmit a frame of a message in an ARQ format from the mobile station to the base station via the transmitter/receiver circuit prior to determining at the mobile station whether the base station is capable of receiving frames of messages in the ARQ format and wherein the circuit is configured to determine whether a response to the message frame is received at the mobile station via the transmitter/receiver circuit;

wherein the message frame comprises a first frame of the message, wherein the circuit is further configured to re-transmit the first frame of the message in a non-ARQ format upon determining that the response to the first frame of the message was not received at the mobile station.

21. The mobile station of claim 20 wherein the circuit is further configured to transmit a second frame of the message in the ARQ format upon determining that the response to the first frame of the message frame was received at the mobile station.

* * * * *